United States Patent [19]
Yeh

[11] Patent Number: 5,236,176
[45] Date of Patent: Aug. 17, 1993

[54] BALL VALVE WITH REINFORCED BALL

[76] Inventor: Ming-Huei Yeh, P.O. Box 55-1670, c/o Hung Hsing Patent Service Center, Taipei (10477), Taiwan

[21] Appl. No.: 977,847
[22] Filed: Nov. 17, 1992
[51] Int. Cl.⁵ .................................. F16K 5/06
[52] U.S. Cl. ............................ 251/315; 251/356
[58] Field of Search ........................ 251/315, 356

[56] References Cited
U.S. PATENT DOCUMENTS 3,323,537  6/1967  Shafer ........................ 251/315 X
3,580,268  5/1971  Shafer ........................ 251/315 X
3,841,601 10/1974  Grove et al. ................ 251/315
3,926,407 12/1975  Forster et al. .............. 251/315

Primary Examiner—John C. Fox

[57] ABSTRACT

A ball valve includes a hollow ball provided with beehive-shaped reinforcing portion in the hollow ball for enhancing a strength of the hollow ball durable of compression, impact or any external force acting upon the ball for increasing a diameter of the ball but decreasing its weight, thereby being beneficial for making ball valves with larger sizes.

6 Claims, 4 Drawing Sheets

BALL VALVE WITH REINFORCED BALL

BACKGROUND OF THE INVENTION

A conventional ball valve is shown in FIGS. 1-3, which includes: a valve casing 1 defining a liquid passage 4 therein, a solid ball 2 rotatably mounted in the valve casing 1 formed with a through hole 3 having a diameter d of the through hole 3, a lever handle 5 connected on a rotating shaft 9 rotatably mounted in the casing for rotating the ball 2, and a pair of valve seats 7 respectively provided on an upstream port and a downstream port of the casing 1 for sealing an aperture 6 between a valve chamber 8 and the ball 2. The valve seat 7 is made of materials having heat and corrosion resistance and durable for pressure and may be made of elastomers such as Teflon. An adapter 10 is provided on each side of the valve casing communicating with the valve chamber 8 to be connected with a piping system (not shown). The rotating shaft 5 is formed with a bottom arcuate portion embedded in an arcuate groove 2a recessed in an upper portion of the ball 2 for driving the ball 2.

When opening a conventional ball valve as shown in FIG. 2, a fluid flows in a direction P from a right side passage 4 of the valve towards a left side passage 4 through the through hole 3. When the valve is closed as shown in FIG. 3, the handle 5 is rotated in 90 degrees to allow the ball 2 to seal the seats 7 to close the valve chamber 8 and aperture 6 and also shield the through hole 3, thereby stopping the fluid flow. A sealing zone of the ball 2 will be sealably engageable with the valve seats 7 for stopping a downstream flow of the liquid through the valve.

Such a conventional ball valve includes the solid ball 2 which is made of heavy metal material. For instance, a ball used for making a ball valve of 12 inches may have a weight of 160 kilograms. Therefore, the heavy weight of the ball will limit the production of ball valves with larger sizes, being unable for maximizing the production of larger ball valve for handling higher flow-rate fluids.

For reducing the weight of the ball, it may be made as a hollow ball body. However, when such a hollow ball is subjected to a high pressure stream or a water hammer action caused by suddenly closing the valve, a deformation of the ball shell will be caused. When such a deformation is beyond an elastic limit of the ball shell, a permanent deformation will then occur. If the permanent deformation influences the ball to exceed a distortion of its sphericity to be 2/100~5/100, the ball will lose its sealing effect and valve closing function.

SUMMARY OF THE INVENTION

The object of the present invention is to provide a ball valve having a hollow ball provided with beehive-shaped reinforcing portion in the hollow ball for enhancing a strength of the hollow ball durable of compression, impact or any external force acting upon the ball for increasing a diameter of the ball but decreasing its weight, thereby being beneficial for making ball valves with larger sizes.

DETAILED DESCRIPTION

Figure 1:
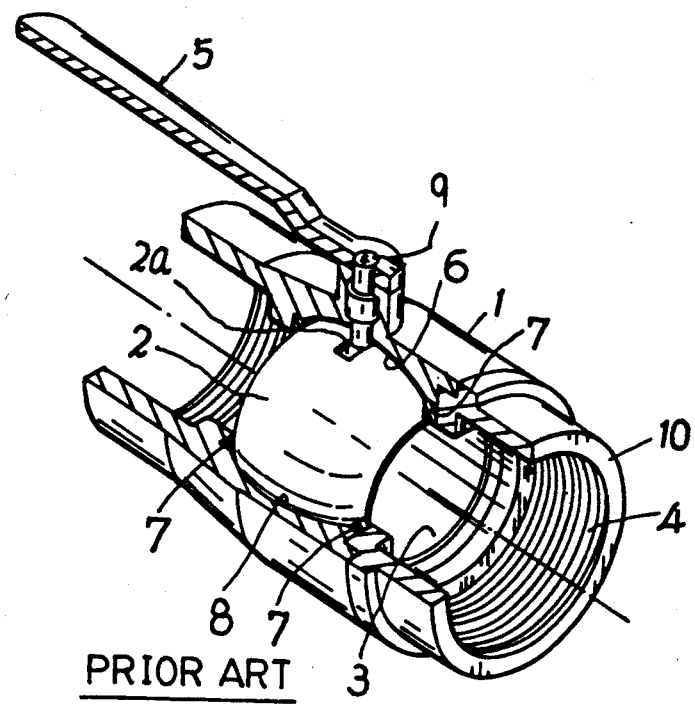
FIG. 1 is a partial cut-away perspective view of a conventional ball valve.
Figure 2:
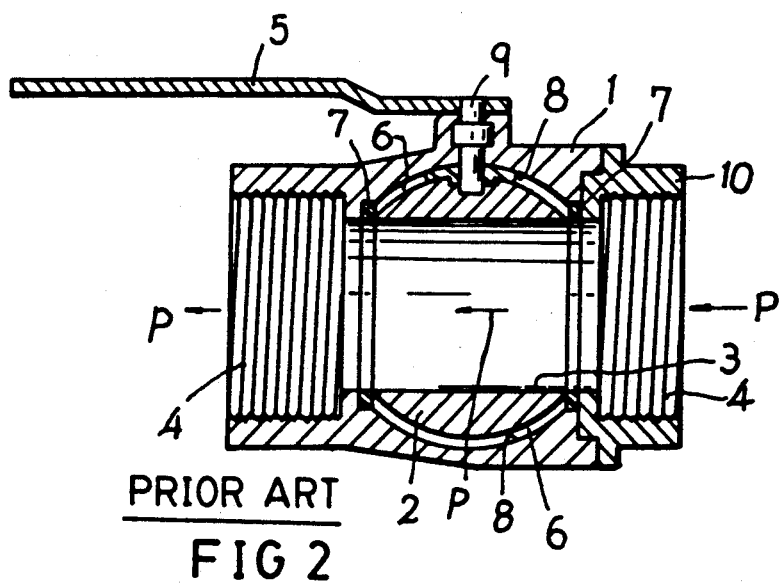
FIG. 2 is a sectional drawing of the conventional valve when opened.
Figure 3:
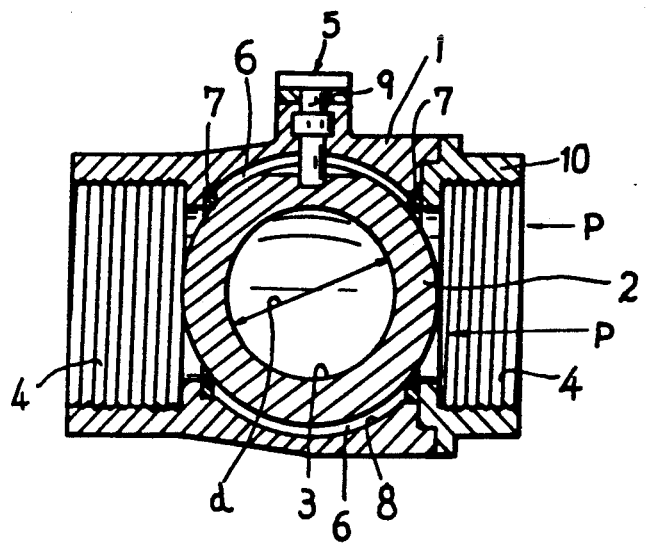
FIG. 3 shows the conventional ball valve when closed.
Figure 6:
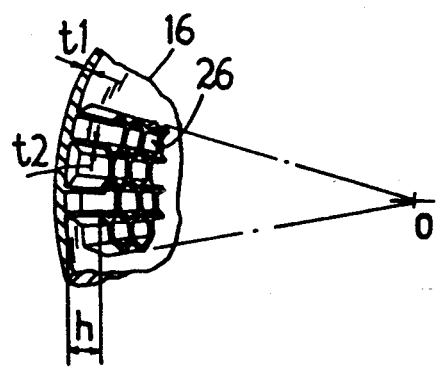
FIG. 6 is a partial perspective view of a hexagonal beehive shaped reinforcing portion of the ball valve of the present invention.
Figure 5:
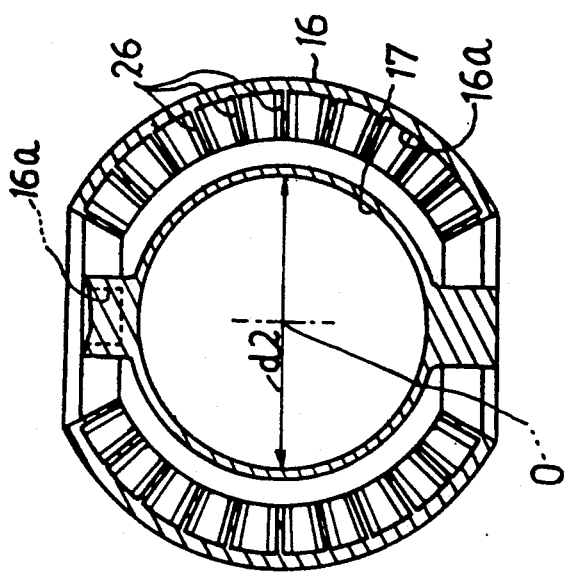
FIG. 5 is an enlarged sectional drawing of a hollow ball of the present invention when viewed from 5—5 direction of FIG. 4.
Figure 4:
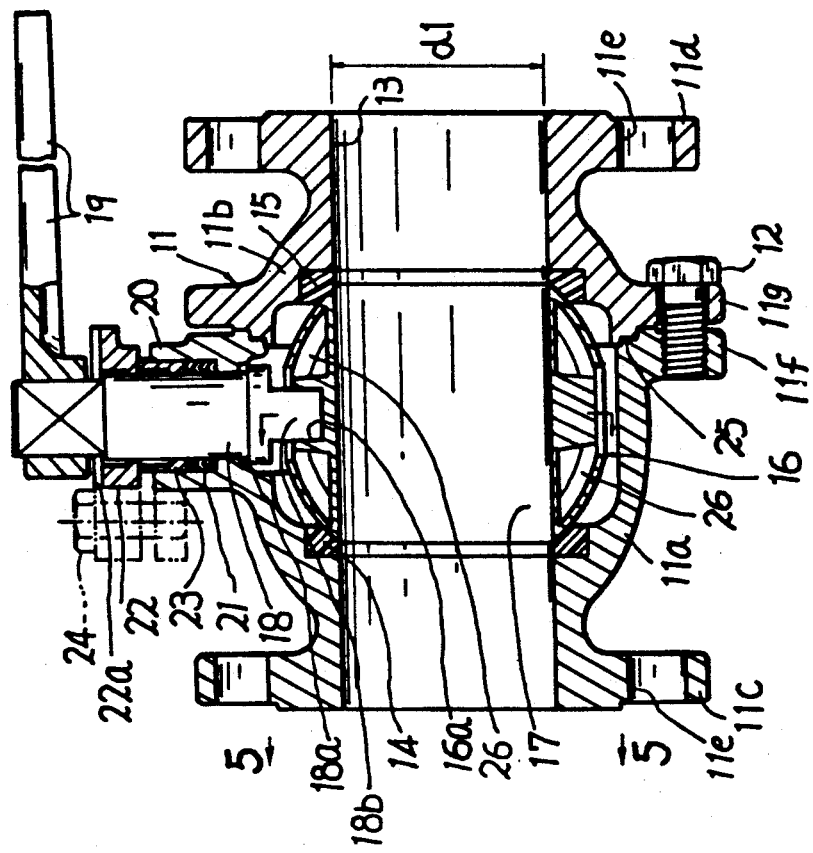
FIG. 4 is a sectional drawing showing an opened ball valve of the present invention.

As shown in FIGS. 4-9, a preferred embodiment of the ball valve of the present invention is described as follows:

A valve casing 11 of the ball valve is made of stainless steel casting or steel casting having been treated with anti-rust surface treatment and is comprised of a left half shell 11a and a right half shell 11b combinable with the left half shell 11a by bolts 12.

Two inner flanges 11f, 11g are formed on the two half shells 11a, 11b to be combined by bolts 12. Two outer flanges 11c, 11d are formed on two outer side portions of the two half shells 11a, 11b for connecting downstream and upstream pipes by fixing bolts (not shown) through bolt holes 11e formed in the two flanges 11c, 11d.

The numeral 13 is a fluid passage formed through the valve casing 11 having an inside diameter d1 generally equal to an inside diameter of each pipe (not shown) connected to either flange 11c, 11d.

Two annular valve seats 14, 15 are respectively formed on an upstream port and a downstream port on the two half shells 11a, 11b to be rotatably engageable with a hollow ball 16 of the ball valve, and may be made of reinforced Teflon material (PTFE).

The hollow ball 16 may be made of stainless steel or steel alloy casting, and is formed with a reinforcing portion 26 inside the hollow ball, having a through hole 17 diametrically formed through the ball 16 communicating with the fluid passage 13 formed in the casing 11 with an inside diameter d2 of the through hole 17 substantially equal to the inside diameter d1 of the fluid passage 13.

A handle 19 is secured with a rotating stem 18 having a lower arcuate plate member 18b of the stem 18 engageably connected with an arcuate groove 16a recessed in an upper portion of the ball 16 and having an anti-thrusting washer or bearing 18a preferably made of Teflon formed in a lower portion of a valve gland 20 for limiting the ball 16 and the stem 18 and preventing their upward movement, so that the handle 19 can be rotated to rotate the stem 18 and the ball 11 in the valve casing 11 for opening or closing the valve.

The gland 20 for rotatably mounting the stem 18 is formed on an upper portion of the valve casing 11, namely formed on the left half shell 11a, having a gland packing 21 stuffed in the gland and retained by a sleeve 23 in the gland 20 and a stem sealing member 22 provided on an upper portion of the gland 20 for adjusting the tightness of the gland packing 21 filled in the gland 20 for properly sealing the stem 18 of the ball valve. The stem sealing member 22 is adjustably fastened on the gland 20 by means of a bolt 24, which is engageable with an upper bolt hole formed in the stem sealing member 22 and a lower bolt hole formed in the gland 20, for adjusting the tightness of the packing 21. A stopper 22a is provided for locking the stem 18. A gasket packing 25 is inserted between the two half shells 11a, 11b for sealing an interface therebetween. The reinforcing portion 26 is integrally formed with the ball 16.

As shown in FIGS. 5, 6, 7 and 8, the reinforcing portion 26 of the hollow ball 16 is formed with an arcuate extension circumferentially formed in an inside spherical surface 16a of the ball and protruding radially from the inside spherical surface 16a towards a center O of the hollow ball 16. The arcuate extension of the reinforcing portion 26 is formed as a beehive shape and includes a plurality of sockets 26a each socket confined by six side walls 26 protruding inwardly from the inside surface 16a of ball 16 and having a cross section of hexagonal shape. Each side wall 26b of the extension has a height h larger than a thickness t1 of the hollow ball shell 16, and a thickness t2 of the side wall 26b equal to or less than the thickness t1 of the hollow ball 16.

The thickness t2 of the side wall 26b of the extension 26 may be equal to 0.6 t1 to 1.0 t1 and preferably be 0.8 t1 to 1.0 t1. The height h of the extension 26 (also side wall 26b) may be equal to 4 t1 to 6 t1, and preferably be 5 t1. If a length of each diagonal line of each hexagonal socket 26a across two opposite angles of the hexagonal shape of the reinforcing portion 26 is defined as L, and a radius of the hollow ball 16 is R, then $L = \frac{1}{2} R \sim 1/12 R$. All above-mentioned thickness, height, and length of the relevant elements of the present invention are not limited.

Figure 9:
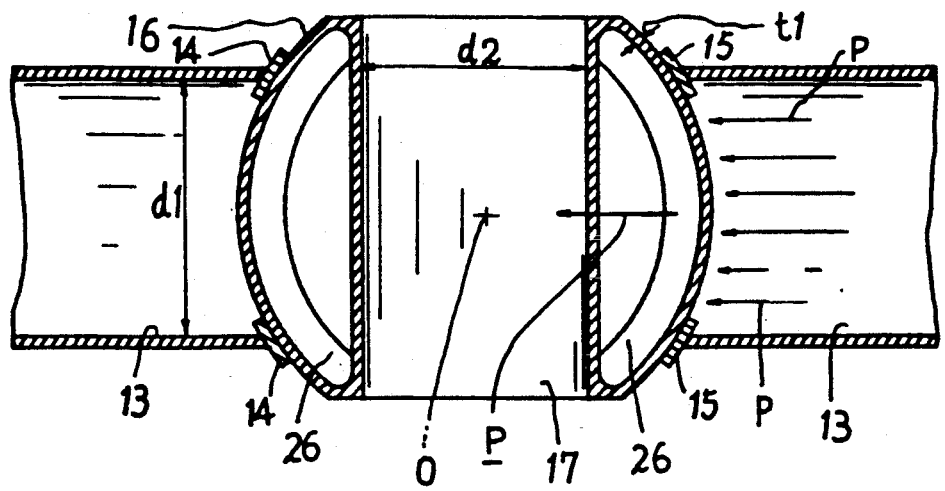
FIG. 9 is a sectional drawing showing the hollow ball as being subjected to a fluid pressure in accordance with the present invention.

Since the reinforcing portion 26 is formed on the inside surface 16a of the hollow ball 16, a section coefficient of the hollow ball 16 can be greatly increased, thereby reducing the strain when the ball 16 is subjected to a high fluid pressure having tendency to cause deformation. As shown in FIG. 9, a right portion of the ball sealing against the upstream seat 15 when acted by a fluid pressure P from an upstream fluid flow will transfer the fluid pressure P leftwardly to act upon the downstream seat 14 to have a tendency to deform the ball body. However, since the present invention discloses the reinforcing portion 26 inside the hollow ball 16, the reinforcing portion 26 as beehive shaped will resist the fluid pressure P to prevent from its deformation and to ensure a complete sealing effect against the valve seats 15, 14.

Whenever gradually closing a ball valve of a piping system handling a fluid of high flow speed from an opened state of the valve, a pressure-receiving zone of the ball 16 as impacted by the dynamic fluid flow will sustain an increasing pressure which however will be distributed to the reinforcing portion 26 of the ball 16 and will be averagely resisted by the beehive-shaped extension. The beehive-shaped reinforcing portion 26 will exert its anti-compression and anti-bending strength to prevent a deformation of the ball, thereby preventing any leakage from the ball valve ensuring a sealing reliability of the ball valve.

Therefore, the ball valve of the present invention may be formed with a hollow ball reinforced with beehive structure to decrease its weight, and the reduction of ball weight may help make a larger ball for maximizing the production of ball valve with larger size, for instance, having a diameter above 12 inches.

The beehive-shaped reinforcing structure of the ball valve will increase a section coefficient of the ball of the present invention in order to greatly reduce or to prevent the deformation of the valve ball, also beneficial for maximizing the production of larger ball valve.

Figures 7, 10, 11:
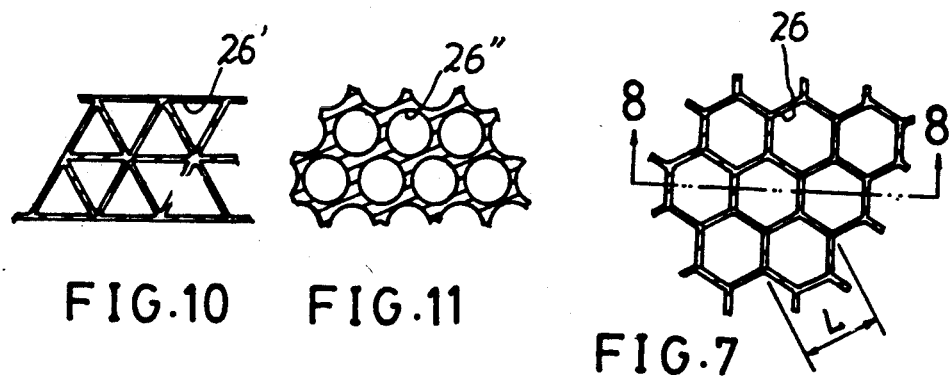
FIG. 7 is a plan view showing the hexagonal beehive shaped reinforcing portion of the present invention.
FIG. 10 shows another preferred embodiment of a triangular shaped reinforcing portion of the ball valve of the present invention.
FIG. 11 shows still another preferred embodiment of a generally cylindrical shaped reinforcing portion of the ball valve of the present invention.
Figure 8:
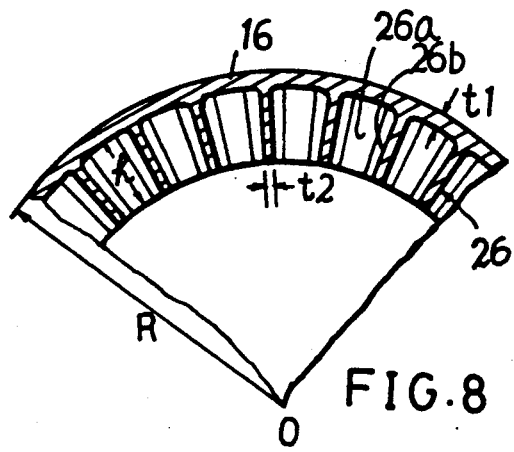
FIG. 8 is a partial sectional drawing of the reinforcing portion of the present invention when viewed from 8—8 direction of FIG. 7.

As shown in FIG. 10, a reinforcing portion 26 of the ball 16 of the present invention may be modified to be a triangular shaped extension including a plurality of sockets 26' each socket 26' confined by three side walls and having a cross section of triangular shape.

The reinforcing portion 26 of the ball of the present invention may also be modified to be a cylindrical extension having a plurality of sockets 26" each socket 26" confined by a cylindrical wall, having a cross section of circular shape.

The shapes or structure of the reinforcing portion 26, the ball 16 and the valve casing 11 are not limited in this invention. The valve ball 16 may be floating-type ball, a free ball or other types of ball. The arcuate extension of the reinforcing portion 26 of the present invention may also be modified to be a plurality of reinforcing ribs (not shown) longitudinally and latitudinally formed on an inside spherical surface 16a of the hollow ball 16.

I claim:

1. A ball valve with a reinforced ball comprising:
a valve casing having a fluid passage formed through said valve casing and a pair of valve seats formed on an upstream port and a downstream port of said passage;
a ball rotatably mounted in said valve casing having a through hole diametrically formed through the ball and operatively communicating with said fluid passage in said valve casing for opening the valve, said ball operatively rotated for disengaging said through hole from said valve seats for closing said valve;
said ball formed as a hollow ball having a reinforcing portion formed with at least an arcuate extension circumferentially formed in an inside spherical surface of said ball for reinforcing said hollow ball for resisting a fluid pressure and external force acting upon said ball and preventing a deformation of said ball;
the improvement which comprises:
said arcuate extension of said reinforcing portion of said hollow ball formed as a beehive shape and including a plurality of sockets each said socket confined by six side walls protruding radially towards a center of the ball and having a cross section of hexagonal shape.

2. A ball valve according to claim 1, wherein a thickness t2 of each said side wall of said socket of said arcuate extension of said reinforcing portion equals to 0.6 t1 to 1.0 t1, wherein t1 is a thickness of a ball shell of said hollow ball.

3. A ball valve according to claim 1, wherein a height h of said side wall of said arcuate extension equals to 4 t1 to 6 t1, wherein t1 is a thickness of a ball shell of said hollow ball.

4. A ball valve according to claim 1, wherein said socket of hexagonal shape has a diagonal line across two opposite angles of the hexagonal shape having a length L generally equal to ¼ R to 1/12 R, wherein R is a radius of said hollow ball.

5. A ball valve with reinforced ball comprising: a valve casing having a fluid passage formed through said valve casing and a pair of valve seats formed on an upstream port and a downstream port of said passage;

a ball rotatably mounted in said valve casing having a through hole diametrically formed through the ball and operatively communicating with said fluid passage in said valve casing for opening the valve, said ball operatively rotated for disengaging said through hole from said valve seats for closing said valve; said ball formed as a hollow ball having a reinforcing portion formed with at least an arcuate extension circumferentially formed in an inside spherical surface of said ball for reinforcing said hollow ball for resisting a fluid pressure and external force acting upon said ball and preventing a deformation of said ball;

the improvement which comprises:

said arcuate extension of said reinforcing portion of said hollow ball including a plurality of cylindrical sockets protruding radially towards a center of said ball from an inside spherical surface of said ball, each said socket having a cross section of circular shape.

6. A ball valve with reinforced ball comprising: a valve having a fluid passage formed through said valve casing and a pair of valve seats formed on an upstream port and a downstream port of said passage;

a ball rotatably mounted in said valve casing having a through hole diametrically formed through the ball and operatively communicating with said fluid passage in said valve casing for opening the valve, said ball operatively rotated for disengaging said through hole from said valve seats for closing said valve; said ball formed as a hollow ball having a reinforcing portion formed with at least an arcuate extension circumferentially formed in an inside spherical surface of said ball for reinforcing said hollow ball for resisting a fluid pressure and external force acting upon said ball and preventing a deformation of said ball;

the improvement which comprises:

said arcuate extension of said reinforcing portion of said ball including a plurality of sockets each said socket confined by three side walls protruding radially from an inside surface of the ball towards a center of said ball and having a cross section of triangular shape.

* * * * *